US005184385A

United States Patent [19]

Valesh

[11] Patent Number: 5,184,385

[45] Date of Patent: Feb. 9, 1993

[54] RETAINER PIN REMOVER

[76] Inventor: Michael L. Valesh, 621 S. Yale, Villa Park, Ill. 60181

[21] Appl. No.: 548,506

[22] Filed: Jul. 3, 1990

[51] Int. Cl.[5] ..................... B23P 19/04

[52] U.S. Cl. ..................... 29/254; 29/275

[58] Field of Search ..................... 29/254, 255, 275, 280; 72/479, 325

[56] References Cited

U.S. PATENT DOCUMENTS

| | | | |
|---|---|---|---|
| 214,031 | 4/1879 | Edmardo | 72/479 |
| 1,218,801 | 3/1917 | Pickles | 72/479 |
| 3,208,134 | 9/1965 | Krewson | 29/255 |
| 3,689,977 | 9/1972 | Crabbe | 29/280 |
| 4,034,595 | 7/1977 | Smith | 72/479 |
| 4,329,766 | 5/1982 | Leonard et al. | 29/254 |

*Primary Examiner*—Robert C. Watson
*Attorney, Agent, or Firm*—Paul H. Gallagher

[57] ABSTRACT

It includes a hand starter having a rear large hand gripping element, a small leading element with a V-notch in its leading end; a hand driver constituted by a rod of a diameter similar to that of the leading element of the driver; a modified hand starter having a bore in its rear end for reception of a power driver; a holder including a flexible string having clips on its ends for detachably clipping onto the pin and the hand driver.

3 Claims, 2 Drawing Sheets

RETAINER PIN REMOVER

FIELD OF THE INVENTION

The invention resides in the field of servicing truck and automobile brakes. Such brakes ordinarily include an assembly that itself includes a spindle unit and a caliper unit, and retainer pins for holding those units in assembled position. The pins, when in such holding position, are necessarily tightly held, and large forces are required to remove them.

The invention relates more particularly to a tool for removing such retainer pins, to enable separating the spindle unit and the caliper unit, for servicing the brakes.

BRIEF SUMMARY OF THE INVENTION

A broad object of the invention is to provide a retainer pin remover of the foregoing character, having the following features and advantages:

1. The tool of the invention is extremely simple and easy to use, and renders it more easy to remove the retainer pin, and requires less time to do so. The simplicity resides in the character of the elements making up the tool, as well as the fabrication of those elements.
2. It includes a novel two-piece design, which is more effective for removing the retainer pins than devices known heretofore.
3. The tool lasts longer than similar devices known heretofore.
4. The tool can be used in manual manipulation, or by a power tool.
5. The tool includes means for gripping and holding the retainer pin, in the step of removing it from its holding position, and preventing it from dropping out of control.

DETAILED DESCRIPTION

Figure 1:
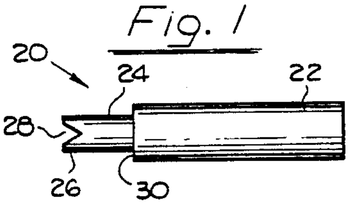
FIG. 1 is a side view of the hand starter of the tool of the invention

Referring in detail of the accompanying drawings, FIG. 1 shows a hand starter 20 having an enlarged handle 22 and a lead element 24 of considerably smaller diameter, the latter having a leading end 26 in which is formed a V-notch 28. The hand starter may be of any suitable dimensions, such as 5–6" in length, and the handle 22 forms a forwarding facing shoulder 30 for a purpose to be referred to hereinbelow.

Figure 2:
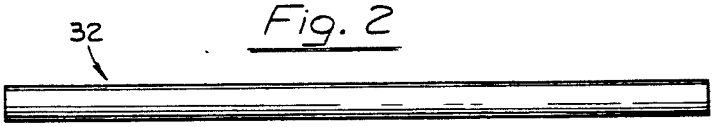
FIG. 2 is a side view of the hand driver.

FIG. 2 shows a hand driver 32 which is a simple cylindrical steel rod. The hand starter 20 and hand driver 32 are of hardened steel to withstand the impacts imposed thereon.

Figure 3:
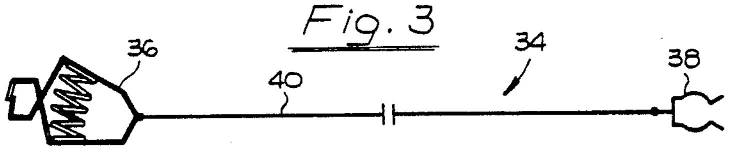
FIG. 3 shows a pin holder.

FIG. 3 shows a pin holder 34 having a clamp 36 of known kind, such as ordinarily is used for gripping a battery post, and a spring clip 38 also of known kind, interconnected by a flexible string or wire 40.

Figure 4:
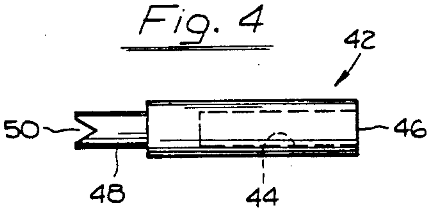
FIG. 4 is a view of a power starter similar to, and constituting a modification of, the component of FIG. 1.

FIG. 4 shows a power starter 42 similar in all respects to the hand starter 20 (FIG. 1) except that it has a socket or recess 44 formed therein opening through the rear end 46 thereof. The power starter 42 has a reduced leading element 48 similar to the element 24 with a V-notch 50 in its leading end.

Figure 5:
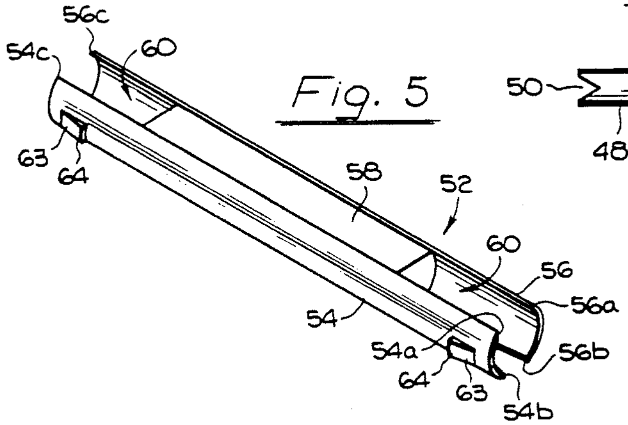
FIG. 5 is a perspective view of a retainer pin with which the tool of the invention is utilized.

FIG. 5 shows in perspective view, a retainer pin of a kind with which the tool of the present invention is particularly adapted for use.

Figure 6:
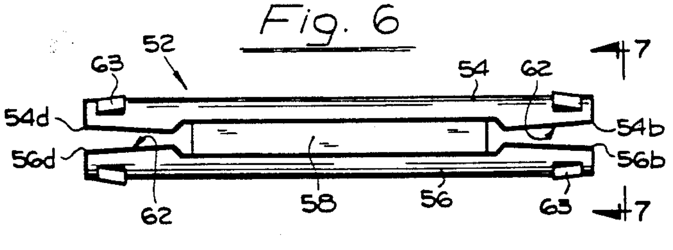
FIG. 6 is a side view of the side of the retainer pin hidden in FIG. 5.

FIG. 6 shows the side of the retainer pin hidden in the view of FIG. 5. The pin, indicated in its entirety at 52, is made up of a pair of opposed parts or elements 54, 56, that are trough shaped and positioned with their concave sides facing each other and are positioned on opposite sides of an insert or slug 58, and firmly secured thereto. The two parts, 54, 56, together form a roughly cylindrical shape, and are so positioned relative to each other that the pin has a wide slot 60 on one side (FIG. 5) and a narrow slot 62 on the other side (FIG. 6). The insert or slug 58 is dense and relatively strong, and possesses limited resilience for normally maintaining the pin parts biased apart to firmly hold the pin in holding position in the brake assembly, but also possessing a limited degree of yieldability, to enable the parts to be compressed or moved toward each other for releasing the pin from the brake assembly. The insert 58 is of considerably lesser length than the parts 54, 56, leaving the end portions of those parts free of interconnection. Each of the parts 54, 56, is provided with a retention tab 63 adjacent to but spaced from each end of the part. These retention tabs may be punched from the body of the material of the parts, and have relatively large perpendicular end surfaces 64 directed toward the middle of the pin, and the outer surfaces of the tabs incline and merge into the main surfaces of the parts 54, 56. The end surfaces 64 serve to hold the pin in place, in holding position, as described hereinbelow.

Figure 7:
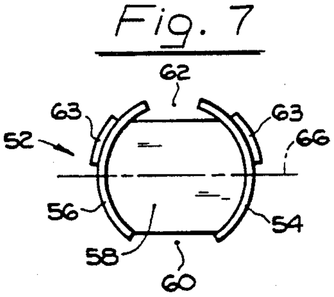
FIG. 7 is an end view of the retainer pin, taken on line 7—7 of FIG. 6.

The retention tabs 63 are arranged in particular position as represented in FIG. 7. This figure includes a diametrical line 66 and the tabs 63 are all on one side of the center, closer to the narrow slot 62 than the wider slot 60.

For convenience in identification and description, the part 54 includes corner tips **54*a*, 54*b*, 54*c*, 54*d*, and similarly the part 56 includes corner tips 56*a*, 56*b*, 56*c*, 56*d***.

Figure 8:
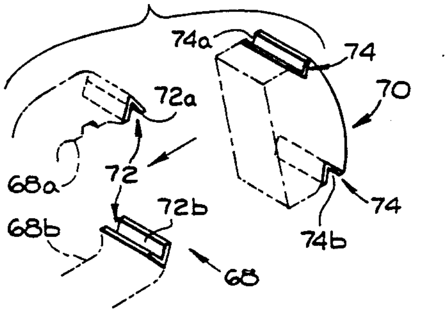
FIG. 8 is a diagrammatic exploded view of portions of the spindle and caliper, of the brake assembly.

FIG. 8 shows, in diagrammatic form, the units making up a brake assembly, namely a spindle unit 68 and a caliper unit 70. The spindle unit includes a pair of opposed elements 68*a*, 68*b* having opposed V-grooves 72, individually identified 72*a*, 72*b*. The caliper unit 70 has V-grooves 74, individually identified 74*a*, 74*b*.

Figure 9:
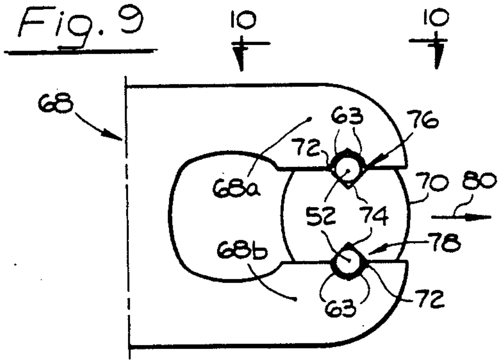
FIG. 9 is a side view of the spindle and caliper in assembled position.

Only a small portion of these units are illustrated, and in diagrammatic form, only sufficient to show the relationship between the units, and the positioning of the retainer pins. The caliper unit 70 (FIG. 9) is fitted between the fork elements 68*a*, 68*b* with the grooves 74 respectively in register with the grooves 72. These respective grooves face each other, in opposed relation, to form holes 76, 78 that are square or polygonal in cross section, and the retainer pins 52 are positioned in these holes. They are put in such position in a known manner, such as by driving them in with a hammer. The spindle unit 68 is in fixed position, in the structure of the automobile, and the caliper unit 70 is held in assembled position, by the spindle unit. Any forces tending to displace the caliper unit are in the direction of the arrow 80 (FIG. 9) and not in the direction perpendicular to the paper. The retainer pins 52 are longer than the corresponding dimension of the units (FIG. 10) and extend outwardly at both ends, and in such position, the retention tabs 63 retain the pin in position. The circumferential positioning of the tabs on the pins, as referred to above (FIG. 7), is such that the tabs engage the forks of the spindle unit 68, and not the caliper unit. FIG. 9 shows the retention tabs so positioned, namely, displaced from the parting lines between the spindle unit and caliper unit. Thus the retention tabs hold the pins in such holding position, i.e., against displacement along the axis of the pins, and the pins themselves hold the caliper unit in the spindle unit.

The two retention pins 52 (FIG. 9) in each assembly are positioned opposite each other, that is, the upper one of the pins is positioned with the narrow slot 62 disposed upwardly, and the lower pin is disposed with the narrow slot directed downwardly. Thus in the case of both of the pins, the retention tabs are positioned on opposite halves of the pair, relative to the respective diametrical line 66 (FIG. 7).

Figure 11:
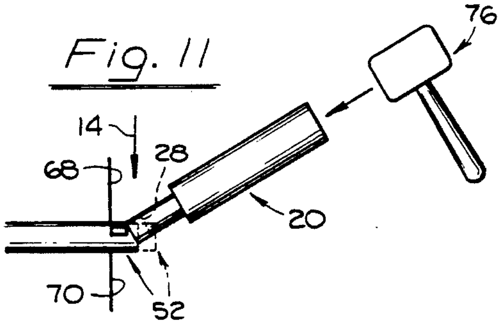
FIG. 11 is a fragmentary view illustrating the use of the tool in a starting step of removing the pin.
Figure 12:
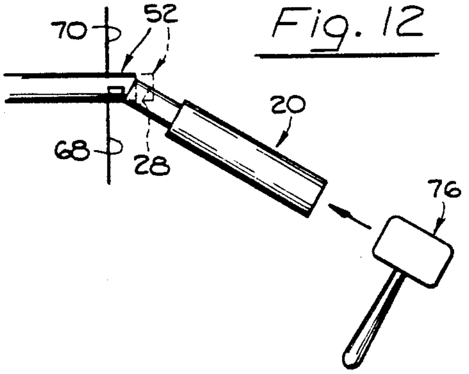
FIG. 12 is a view similar to FIG. 11, but showing the tool at a different angle.
Figure 10:
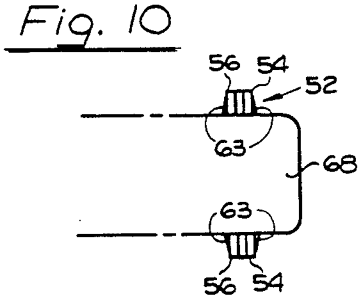
FIG. 10 is a top view taken at line 10—10 of FIG. 9.

FIGS. 11 and 12 represent a first step in removing the retainer pins, these figures together showing the retainer pins in the same positioning as in FIG. 10. In FIGS. 11 and 12 the surfaces of the spindle unit 68, and caliper unit 70 are indicated, with the retention tabs engaging the spindle unit. To remove the pin, in a manual operation, the hand starter 20 is utilized, and poised upwardly at an angle and the V-notch is fitted to the end of the pin, and in straddling relation to the corner tips, and driven as by a hammer 76. This collapses the corresponding corner tips (FIG. 14), moving the tabs radially inward and enabling them to pass through the hole 76. The pin is so driven only a short distance, only sufficient to start the tabs through the hole, and in this step, no attempt is to be made to drive the pin out of the hole.

FIG. 12 shows the positioning of the hand starter 20 at a different angle from that of FIG. 11, because of the corresponding and opposed positioning of the pin 52, in the lower position relative to that of the upper position. The respective angular positions of the starter in the two figures show the V-notch as engaging the tabs, in each case. The corner tips so engaged are 54*b*, 56*b* in FIG. 11 and 54*d*, 56*d* in FIG. 12.

After the pin is started out, as represented in FIGS. 11 and 12, the hand driver 32 is utilized (FIG. 13), fitting a leading end thereof to the pin and driving it by the hammer 76. The pin is then driven completely through and out of the hole.

The pin holder 34 is utilized in this latter step (FIG. 13) to hold the pin and prevent it from dropping out of control. For this purpose and before this step is started, the clip 38 is detachably fitted to the hand driver, and the clamp 36 is fitted to a corner of the pin, and thus after the pin is driven out of the hole it remains gripped by the clamp and easily retrieved by the operator.

Figure 13:
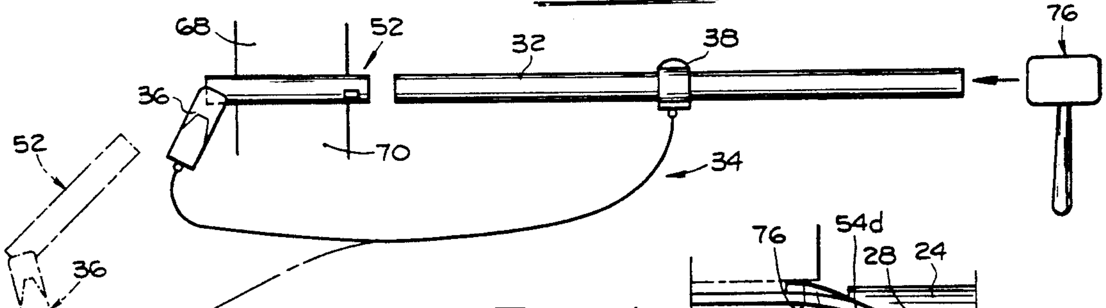
FIG. 13 is a fragmentary view showing the removal of the pin, after the starting step.
Figure 14:
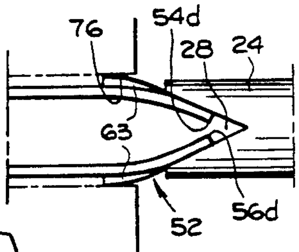
FIG. 14 is a fragmentary view oriented according to the arrow 14 of FIG. 11.

FIG. 14 is a relatively large scale view oriented according to the arrow 14 in FIG. 11. FIG. 14 shows the lead element 24 of the hand starter 22, and particularly the notch 28 applied to the end of the pin 52. This figure also diagrammatically shows a hole 76, and the pin therein, but with the end points (54*d*, 56*d*) compressed toward each other and with the retention tabs 63 correspondingly moved inwardly to a position within the diameter of the hole. The pin had been started in before, from its outermost position, and the retention tabs are started into the hole 76, and thus confined by the surfaces of the hole. This represents the completion of the starting step, and of course the pin is held in that position, by friction, and the starter 22 is removed, and then the next step performed, as represented in FIG. 13.

Figure 15:
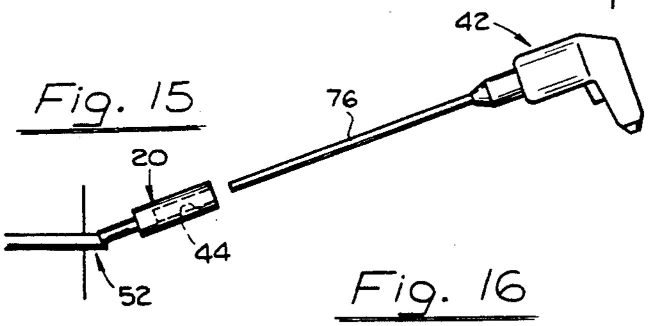
FIG. 15 is a fragmentary view illustrating the use of a power tool in the pin.
Figure 16:
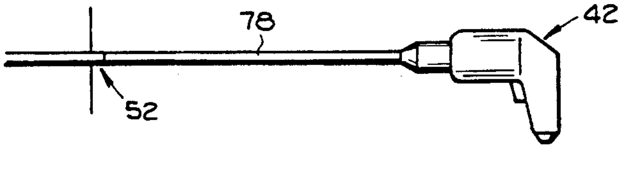
FIG. 16 is a view showing a power tool in removing a pin, in an advanced step relative to that of FIG. 15.

The foregoing had to do with manual actuation of the tool, but as mentioned above, the tool is well adapted for use with power tools. In this case, the power tool 77 is utilized as represented in FIGS. 15, 16. The power starter 42 is applied in a first step at an angle represented in FIG. 11. The power tool is a power hammer, and a power driver is shown at 78, both generally used by operators in this field. and the recess or socket 44 is so dimensioned as to receive the power driver. In this step, the power hammer is first actuated to start the pin, in the same manner as was done manually as represented in FIGS. 11, 12. After the pin has been started, the power hammer is then utilized as represented in FIG. 16, in which the power driver is directly engaged with the pin, and it drives the pin out, as referred to above and represented in FIG. 13.

An advantage of the invention is that a tool made according to the invention, is put out in a kit made up of the hand starter 20 (FIG. 1), the hand driver 32 (FIG. 2) and the pin holder 34 (FIG. 3). In the use of the tool in this form, the operator uses the hand starter and hand driver separately, that is, he starts the pin with the hand starter, and a hammer, and then uses the hand driver, with the hammer, to drive the pin out.

When it is desired to have a tool for use particularly with a power tool, then the power starter 42 is included in the kit, rather than the hand starter 22. In this case the power tool is easily applied to the power starter.

It is also possible, and practical, in a manual operation, to utilize the power starter 42, instead of the hand starter 20, and in that case the operator merely raps the power starter with the hammer.

Each starter, that is, the hand starter 20, and the power starter 22, possesses an advantage, in having the small forward end, and the large handle portion 22. The large handle portion facilitates grasping the member by the hand, and the forward shoulder 30 prevents the operator from driving the pin all the way out of the hole, that shoulder of course engaging the units of the brake assembly and preventing further movement.

The hand driver 32 provides an advantage in its relatively great length. Such length prevents or at least minimizes binding or jamming of that member in the hole, in driving the pin out.

The hand driver is of a diameter only slightly less than the defining surfaces of the hole, to enable it to be driven thereinto without binding and with only a minimum of friction, but the hand driver is considered of the same effective dimension, in diameter direction, as the defining surfaces of the hole, this relationship being significant in assuring that the driver effectively engages the end of the pin and does not enter into it.

A similar relationship is that the recess or socket 44 in the power starter (FIG. 4) is only slightly larger than a common diameter of power driver 78 (FIG. 15). In this case the recess may be 0.439" and that of the power driver being 0.4375". Thus these dimensions may be considered effectively equal from a practical standpoint, in that they prevent any undue play, but they enable the starter to be easily slid into the recess.

It is practical to include in a kit, both starters, i.e., the hand starter 22 and the power starter 42, if so desired.

I claim:

1. A retainer pin remover tool for use in conjunction with a brake assembly wherein, the brake assembly includes a spindle and a caliper as separate members and has interengaging surfaces with grooves therein together forming a hole of predetermined effective size between those elements, a retainer pin is removably positioned in the hole and operable for retaining those members in predetermined position relative to each other, the retainer pin is of predetermined size and elements at an end having a normal outer expanded position in which they are included in said predetermined size and compressible into an inner position of smaller size, the surfaces of said members and the retainer pin having cooperating projections that, in the outer position of said elements of the pin, interengage and retain the retainer pin in the hole, and in the inner position of those elements are released and prevented from interengagement and thereby enabling the retainer pin to be driven from the hole, the retainer pin remover tool comprising, a hand starter including a lead element having a V-notch in a leading end thereof and having an opposite rear end, said lead element being capable of having its leading end applied endwise to an end of the retainer pin with said end elements of the retainer pin received in the V-notch, and operable, in response to impact on its rear end, for compressing said elements to their said inner position and thereby releasing said cooperating projections and thereby enabling the retainer pin to be driven from the hole, the tool also including a power starter, said lead element is cylindrical in shape, the power starter including a rear enlargement on which said shoulder is formed, the enlargement having a cylindrical bore extending inwardly from its rear end, of substantially the same diameter as said lead element, and the tool also includes a hand driver, the hand driver being cylindrical in shape and of effectively the same diameter as said lead element.

2. A retainer pin remover tool for use in conjunction with a brake assembly wherein, the brake assembly includes a spindle and a caliper as separate members and has interengaging surfaces with grooves therein together forming a hole of predetermined effective size between those elements, a retainer pin is removably positioned in the hole and operable for retaining those members in predetermined position relative to each other, the retainer pin is of predetermined size and elements at an end having an normal outer expanded position in which they are includes in said predetermined size and compressible into an inner position of smaller size, the surfaces of said members and the retainer pin having cooperating projections that, in the outer position of said elements of the pin, interengage and retain the retainer pin in the hole, and in the inner position of those elements are released and prevented from interengagement and thereby enabling the retainer pin to be driven from the hole, the retainer pin remover tool comprising, a hand starter including a lead element having a V-notch in a leading end thereof and having an opposite rear end, said lead element being capable of having its leading end applied endwise to an end of the retainer pin with said end elements of the retainer pin received in the V-notch, and operable, in response to impact on its rear end for compressing said elements to their said inner position and thereby releasing said cooperating projections and thereby enabling the retainer pin to be driven from the hole, a holder detachable connectable to the tool and the retainer pin to hold the retainer pin after the latter is driven out of the hole for preventing it from being dropped out of control.

3. A tool according to claim 2 wherein, the holder includes a length of flexible string and clips secured to the ends thereof, the clips being capable of being detachably connected to the retainer pin and the tool respectively.

* * * * *